Figure 1:
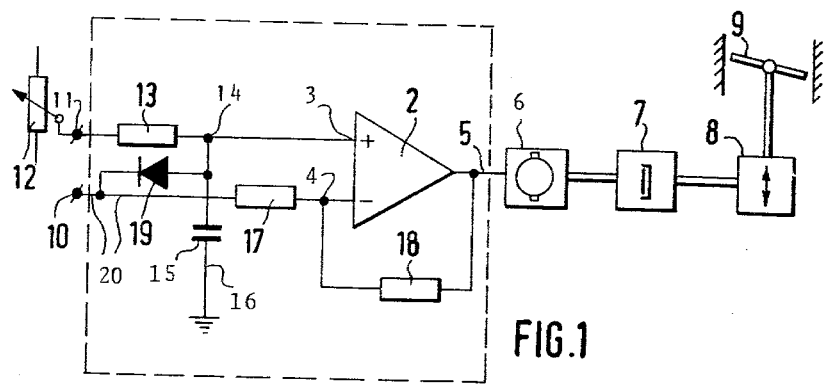

United States Patent [19]

Collonia

[11] 4,250,845
[45] Feb. 17, 1981

[54] DEVICE FOR THE CONTROL OF THE POSITION OF AN ELEMENT OF AN INTERNAL COMBUSTION ENGINE WHICH INFLUENCES THE FUEL-AIR MIXTURE

[75] Inventor: Harald Collonia, Königstein, Fed. Rep. of Germany

[73] Assignee: VDO Adolf Schindling AG, Frankfurt am Main, Fed. Rep. of Germany

[21] Appl. No.: 20,292

[22] Filed: Mar. 14, 1979

[30] Foreign Application Priority Data

Mar. 20, 1978 [DE] Fed. Rep. of Germany ....... 2812156

[51] Int. Cl.³ .......................................... F02D 11/10
[52] U.S. Cl. .................................... 123/361; 180/178
[58] Field of Search .............. 123/102, 98; 180/105 E

[56] References Cited

U.S. PATENT DOCUMENTS 4,133,406   1/1979   Allerdist ............................. 123/102

Primary Examiner—Ronald B. Cox
Attorney, Agent, or Firm—Martin A. Farber

[57] ABSTRACT

A device for the control of the position of an element of an internal combustion engine which influences the fuel-air mixture, particularly for the rotational speed control, which element is coupled with a servomotor, the latter being fed by the output of a differential amplifier, whereby an actual value input of the differential amplifier is in connection with an actual value transmitter and a desired value input of the differential amplifier is connected with a desired value transmitter. A diode is arranged from the desired value input to the actual value input connected in the forward conducting direction, and a resistor is connected between the junction point of the desired value input with the diode and the desired value transmitter.

3 Claims, 2 Drawing Figures

DEVICE FOR THE CONTROL OF THE POSITION OF AN ELEMENT OF AN INTERNAL COMBUSTION ENGINE WHICH INFLUENCES THE FUEL-AIR MIXTURE

The present invention relates to a device for the control of the position of an element of an internal combustion engine which influences the fuel-air mixture, particularly for the rotational speed control, which element is coupled with a servomotor, the latter being fed by the output of a differential amplifier, whereby an actual value input of the differential amplifier is in connection with a variable resistor as an actual value transmitter and a desired value input of the differential amplifier is connected with a desired value transmitter.

Known devices of this type, with a corresponding wiring of the actual value input and of the desired value input of the differential amplifier, can be used for controlling the rotational speed (rpm) or for controlling the travelling (or driving) speed to a value which is pre-given with the desired value or as a so-called electric gas pedal, with which the position of the gas pedal is converted into an electrical signal as the actual value. For the control of the rotational speed, an electrical rotary (shaft speed) transducer or transmitter is used as an actual value transmitter, while for the control of the travelling (driving) speed, an electrical velocity transducer is provided as a desired value transmitter. For the formation of the control difference in the differential amplifier these transducers deliver an analog voltage corresponding to the actual value or an analog current. The desired value transducer, which is formed as a rule as an arbitrarily adjustable resistor, feeds a voltage corresponding to the desired value or a corresponding current into the differential amplifier.

It is problematic with all control operations resulting with such devices, that, upon changes of the desired value, a more or less pronounced over-shooting of the setting or positioning value, here the position of the element which influences the fuel-air mixture, can occur in dependency on the amplification, which amplification is set or adjusted in the formed automatic control system. In order to reduce such over-shooting the amplification of the automatic control system must be reduced by increasing the proportional band. Disadvantageously the control precision goes down. In order to deal with no large over-shooting in spite of satisfactory control precision, a structure can be inserted in the controller which forms a D-fraction or D-portion of the transient response. Apart from the fact that the insertion of the D-portion increases the manufacturing expense, an improper dimensioning of the D-fraction can lead to a (monotonic) instability of the automatic control system.

The present invention correspondingly is based on the object to produce a device for controlling the position of a fuel-air mixture-influencing element of an internal combustion engine of the introductory-mentioned type, which, while avoiding the disadvantages of the known devices, makes possible a most stable control action with the lowest possible expense and with non-critical dimensioning.

It is another object of the invention to aid the solution of the introductory mentioned object in the manner that a diode (19) is arranged from the desired value input (3) to the actual value input (4), the diode (19) being connected in the forward conducting direction, and a resistor (13) is connected between the junction point (14) of the desired value input (3) with the diode (19) and the desired value transmitter (12).

With this circuit arrangement which assumes the feeding or application of the desired value and the actual value in the form of analog voltages, the voltage potential which represents the desired value at the desired value input of the differential amplifier always is held somewhat above the potential representing the actual value, independent of the desired value that is respectively set at the time. This occurs in the manner that the potential of the desired value with a low actual value is pulled to the potential of the actual value by the difference of the diode voltage, and can increase corresponding to the increase of the actual value, until the potential (representing the desired value) at the desired value input practically is equal to the potential supplied from the desired value transducer or transmitter.

In this manner a very stable control command behaviour of the automatic control system is achieved with low expense and non-critical dimensioning of the components.

In a particularly suitable manner the device of the invention is formed such that a capacitor (15) is arranged between the junction point (14) of the desired value input (3) with the diode (19) and a grounded line (16), and the capacitor (15) together with the resistor (13) between this junction point (14) and the desired value transmitter (12) forms a resistor-capacitor combination.

The effect of the capacitor is that the automatic controller steps into action even already with a certain changing speed or rate of change of the actual value, whereby the dynamic stability is further improved.

Further the device in accordance with the invention is suitably formed in a manner such that the diode (19) and the actual value transmitter (at terminal 10) are connected via a common series drop resistor (17) with the actual value input (4), and a feedback resistor (18) is arranged between the actual value input (4) and the output (5) of the differential amplifier (2).

The proportional band of the controller is adjusted or set corresponding to the ratio of the feedback resistor to the series drop resistor, independent of the diode which is provided according to the invention and the resistor in the supply line to the desired value input.

Figure 2:
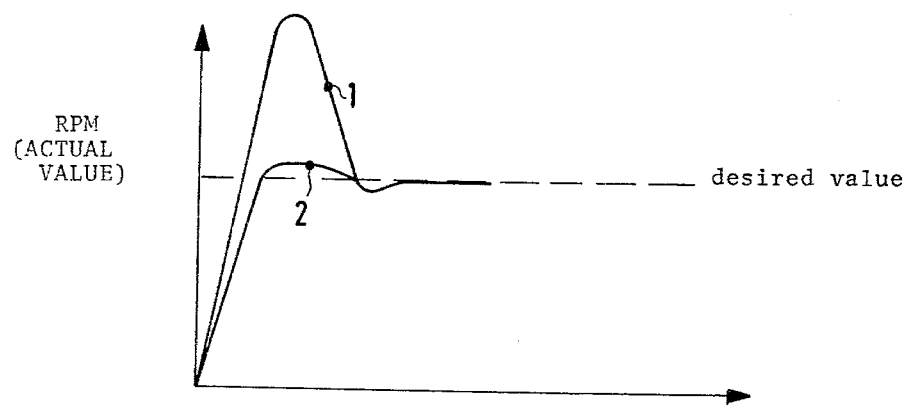

With the above and other objects and advantages in view, the present invention will become more clearly understood in connection with the detailed description of a preferred embodiment, when considered with the accompanying drawing, of which:

FIG. 1 is a simplified circuit diagram of the device for the control of the position of the throttle valve for the rotational speed control in accordance with the invention; and FIG. 2 is a graph showing control or command action achieved with this device.

Referring now to the drawing, in FIG. 1 a housing 1 indicated in dashed lines receives an electronic part of the device. As an essential or important integral part, the device contains a differential amplifier 2 with a desired value input 3 and an actual value input 4 as well as with an output 5.

The output 5 is connected to a servomotor 6 which adjusts or regulates a positioning or adjustment actuator 8 of a throttle valve 9 via clutch 7.

In the case in which the position of the throttle valve is supposed to be controlled in connection or relationship with a so-called electronic gas pedal, a slider or wiper of a variable resistor (not shown in the drawing) can be coupled with the adjustment or positioning actuator 8, the variable resistor being connected with a terminal 10 which is provided for the connection of an actual value transmitter or transducer.

U.S. Pat. No. 4,039,043 dated Aug. 2, 1977 is hereby incorporated by reference herein to illustrate by way of example an actuator and other elements which can be used with the present invention. Also German Patent Application No. 26 58 093 filed Dec. 22, 1976 and published July 6, 1978 is hereby incorporated by reference herein. In this Application an actuating system is described comprising a servomotor, an electromagnetic clutch and an actuator.

An adjustable resistor 12 serves as the desired value transmitter or transducer. The adjustable resistor 12 is adjustable or regulatable arbitrarily at will and is connected to a terminal 11.

With the use of the device for the rpm or rotational speed control, a rpm rotary (shaft speed) transducer (not shown) is connected to the terminal 10, which transducer emits a voltage proportional to the rotational speed.

The desired value transmitter 12 stands in operative connection with the desired value input 3 of the differential amplifier 2 via a resistor 13. A capacitor 15 is connected to the common junction point 14 of the resistor 13 with the desired value input 3. The other end of the capacitor 15 is connected with a grounded or chassis connected line 16. The capacitor 15 jointly with the resistor 13 forms a resistor-capacitor RC combination.

The terminal 10 for the connection of the actual value transmitter is led to the actual value input 4 via a series (drop) resistor 17. A feedback resistor 18 connects the output 5 of the differential amplifier 2 with the actual value input 4 of the differential amplifier.

The junction point 14 of the resistor 13 with the desired value input 3 is in connection via a diode 19 with the connection line 20 between the terminal 10 for the connection of the actual value transmitter and the series (drop) resistor 17. The diode 19 besides is connected or directed in the forward conducting direction, whereby it is provided that even increasing voltages are coordinated or associated to increasing desired values and the reverse.

The diode 19, which holds the potential at the junction point 14 only somewhat over the potential at the line 20 between the terminal 10 and the series (drop) resistor 17, and the combination of the resistor 13 with the capacitor 15, which combination even already with a certain increasing speed or rising rate of the actual value (which actual value is applied to the terminal 10) causes the controller to step into action, provide an important substantial improvement in the dynamic stability. This improvement is illustrated in FIG. 2.

FIG. 2 illustrates the time dependency of the rpm or rotational speed of an internal combustion engine which is controlled with a device according to FIG. 1, compared to the time change of a comparable device however without the resistor-capacitor combination 13, 15 and without the diode 19, when a rectangular jump or step of the desired value occurs at the terminal 11. Particularly to be recognized from FIG. 2 is that a strong first over-shooting of the curve 1 occurs, which shows the transient response of a conventional device for the control of the throttle value position, while the first over-shooting of the curve 2 of the device according to the invention is substantially lower. The curve 2 shows altogether a substantially better dynamic course of the actual value than the curve 1.

While there has been disclosed one embodiment of the invention this embodiment is given by example only and not in a limiting sense.

It is claimed:

1. In a device for the control of the position of an element of an internal combustion engine, which element influences the fuel-air mixture, particularly for rotational speed control, and which element is coupled with a servomotor, the latter being fed by the output of a differential amplifier, with an actual value input of the differential amplifier being in connection with an actual value transmitter and a desired value input of the differential amplifier being connected with a desired value transmitter, the improvement comprising
   a diode connected in the forward conducting direction is arranged from the desired value input to the actual value input, and a resistor is connected between a junction point of the desired value input with said diode and the desired value transmitter,
   a grounded line,
   a capacitor is arranged between said junction point of the desired value input with said diode and said grounded line, and
   said capacitor together with said resistor between said junction point and the desired value transmitter forms a resistor-capacitor combination.

2. The device as set forth in claim 1, further comprising
   a common series drop resistor connected to the actual value input,
   said diode and the actual value transmitter are connected via the common series drop resistor with the actual value input, and
   a feedback resistor is connected between the actual value input and an output of the differential amplifier.

3. In a device for the control of the position of an element of an internal combustion engine, which element influences the fuel-air mixture, particularly for rotational speed control, and which element is coupled with a servomotor, the latter being fed by the output of a differential amplifier, with an actual value input of the differential amplifier being in connection with an actual value transmitter and a desired value input of the differential amplifier being connected with a desired value transmitter, the improvement comprising
   a diode connected in the forward conducting direction is arranged from the desired value input to the actual value input, and a resistor is connected between a junction point of the desired value input with said diode and the desired value transmitter,
   a common series drop resistor connected to the actual value input,
   said diode and the actual value transmitter are connected via the common series drop resistor with the actual value input, and
   a feedback resistor is connected between the actual value input and an output of the differential amplifier.

* * * * *